Nov. 27, 1923.

J. R. WILLIAMS 1,475,912

AUTOMOBILE SEAT WARMER AND COOLER

Filed Aug. 17, 1922

Inventor
John R. Williams

By

Attorney

Patented Nov. 27, 1923.

1,475,912

UNITED STATES PATENT OFFICE.

JOHN R. WILLIAMS, OF MIAMI, ARIZONA.

AUTOMOBILE SEAT WARMER AND COOLER.

Application filed August 17, 1922. Serial No. 582,501.

*To all whom it may concern:*

Be it known that I, JOHN R. WILLIAMS, a citizen of the United States, residing at Miami, in the county of Gila, State of Arizona, have invented certain new and useful Improvements in Automobile Seat Warmers and Coolers; and I do hereby declare the following to be a full, clear, and exact description of the invention, such as will enable others skilled in the art to which it appertains to make and use the same.

This invention relates to seats, and particularly to automobile seats.

The principal object of the invention is to provide a seat which is so constructed that the occupant will be kept cool, in the warm weather, and warm in the cold weather.

Another object is to so construct a seat of this character that the cool air may be readily drawn from the radiator, in front of the automobile, and the warm air from within the hood.

Other objects and advantages will be apparent from the following description when taken in connection with the accompanying drawing.

Figure 1:
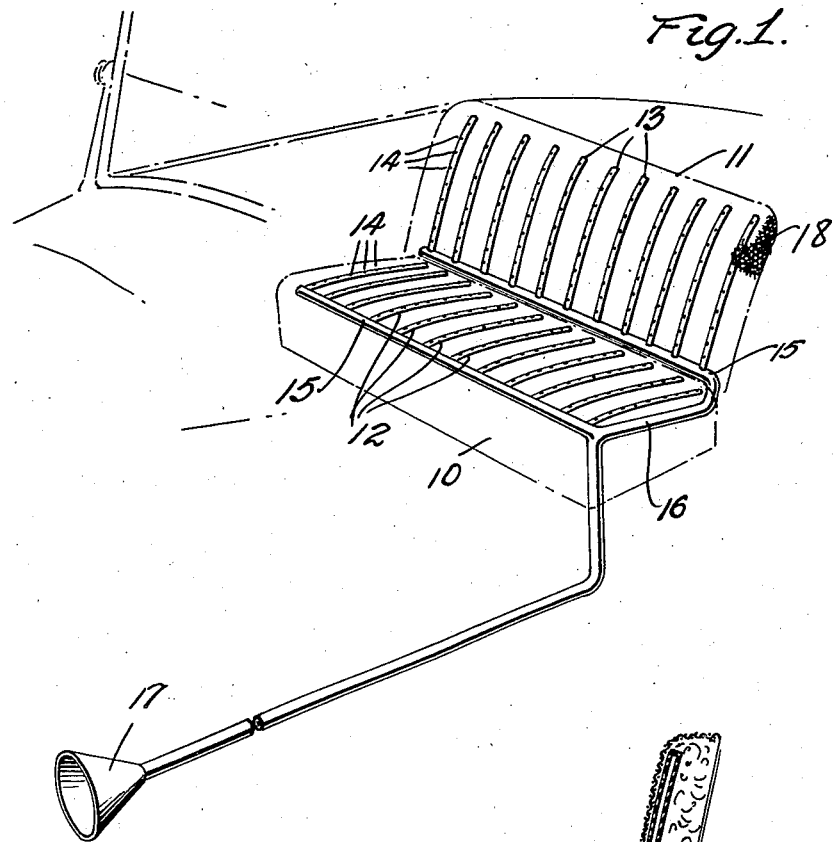
Figure 1 is a perspective view of a seat made in accordance with the invention.
Figure 2:
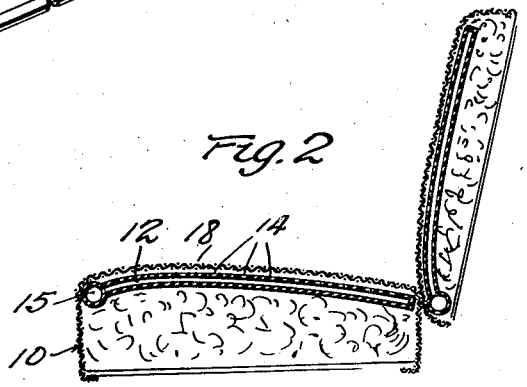
Figure 2 is an enlarged vertical sectional view through the seat.

Referring particularly to the accompanying drawing, 10 represents the bottom, and 11 the back of a seat, which is especially adapted for an automobile. Secured to the bottom 10, and extending from the front edge thereof to the back 11, are the flexible tubes or pipes 12, the same being preferably formed from rubber, or rubber and fabric combined. Secured to the back 11, and extending from the seat 10, to the upper edge of the back, are the similar tubes 13, the tubes 12, as well as the tubes 13, being formed with longitudinal series of openings 14, in their upper sides. Extending transversely of the seat bottom 10, respectively at the front edge, and at the bottom of the back 11, are the imperforate tubes or pipes 15, the adjacent ends of the tubes 12 and 13 being connected therewith, and having their interiors communicating with the interiors of the tubes 15. Secured to the seat bottom 10, and extending along one side thereof, is a portion of an imperforate pipe 16, the same having a funnel 17 on its other end and being arranged to be supported in front of the radiator, or within the hood of an automobile. One end of each of the imperforate tubes 15 is connected with the tube 16, while its other end is closed.

When the tube 16 is so placed that its funnel is disposed in front of the radiator of an automobile, the draft created in front of the automobile will drive a current of cool air through the pipe, and said air will issue from the perforations of the tubes 12 and 13, with the result that the occupant of the seat will be surrounded by a constant series of streams of cool air. When the funnel is placed beneath the hood of the automobile the warm or hot air, arising from the engine, will be forced back by the fan and issue through the perforations of the tubes 12 and 13, thus surrounding the occupant of the seat with warm air. The former, as will be readily understood, is adapted for warm weather, while the latter is adapted for use in cold weather. In either case the driver, or occupant of the seat, is kept comfortable.

A porous material, such as is used on cane-seat chairs, is secured over the tubes 12 and 13, and the tubes 15 and 16, as shown at 18.

What is claimed is:

As an article of manufacture, a seat warmer and cooler comprising a main air conducting pipe having a pair of laterally directed branches extending in the same plane and in parallel relation, a plurality of perforated pipes extending from one of the said branches in a direction toward the other branch and in the same plane therewith, and a plurality of perforated pipes extending in parallel relation to each other and at an angle to the other branch and being connected thereto.

In testimony whereof, I affix my signature, in the presence of two witnesses.

JOHN R. WILLIAMS.

Witnesses:
S. W. ELLERY,
W. R. JONES.